United States Patent Office 2,999,873
Patented Sept. 12, 1961

2,999,873
PROCESS FOR THE PREPARATION OF ORGANIC ISOCYANATES
Albert Bloom, Summit, N.J., Harlan B. Freyermuth, Easton, Pa., and James B. Normington, Little Silver, N.J., assignors to General Aniline & Film Corporation, New York, N.Y., a corporation of Delaware
No Drawing. Filed July 9, 1956, Ser. No. 596,395
4 Claims. (Cl. 260—453)

The present invention relates to an improved process of preparing organic isocyanates by reacting together in the liquid phase an aliphatic or aromatic amine and phosgene in a relatively short time and in high yields.

It is known that organic isocyanates, including poly-isocyanates, find considerable use in the chemical industry in the manufacture of rubber, rubber-like materials, adhesives, coating agents, insulating agents, synthetic fibers, and the like. In general these isocyanates are prepared by reacting the salt of an amine such as the hydrochloride with phosgene in an inert solvent. Various solvents or suspending agents have been suggested in the patent and chemical literature, such as, for example, toluene, xylene, chlorobenzene, orthiodichlorobenzene, tetrahydronaphthalene, benzene, chlortoluenes, chlorinated aromatic hydrocarbons, dichlorbenzene, nitrobenzene, cyclohexane, kerosene, carbontetrachloride, tetrachlorethylene, trichlorethylene, trichlorbenzene, decahydronaphthalene, tetrahydronaphthalene, amylbenzene, ortho, meta and paracymenes, dodecylbenzene, naphthalene, heptylcyclopentane, diphenyl and partially hydrogenated aromatic hydrocarbons, boiling above 340° C., halogenated organic solvents boiling at about 275–400° C. such as chlorinated diphenyls, etc. In addition, decahydronaphthalene, amylbenzene, tetrahydronaphthalene and cymene, dioxane and dibutyl ether have been suggested.

In the actual manufacture of mono-isocyanates and poly-isocyanates, the amine or polyamine is first dissolved in any one of the aforementioned solvents and then either converted to the chloride or polychloride by treatment with hydrogen chloride or converted to a carbamyl chloride by treatment with phosgene. The primary reaction product on further treatment with phosgene at elevated temperature is converted to the corresponding mono- or poly-isocyanate. For example, in the manufacture of tolylene diisocyanate, a tolylene diamine is dissolved in a solvent such as o-dichlorobenzene and treated with phosgene at a temperature of 0–5° C. This gives rise to a mixture in which the main component quite probably is the carbamyl hydrochloride as shown by the following reaction:

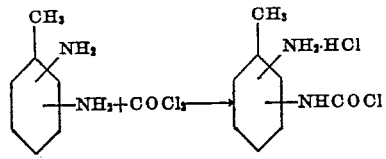

This carbamyl chloride hydrochloride is an insoluble material and when the reaction mixture is heated up remains insoluble. By insoluble we do not mean that there is a complete absence of solubility but rather that there is limited solubility. Now the reaction mixture at about 140–160° C, is further treated with phosgene and the carbamyl chloride hydrochloride is then converted to the diisocyanate as shown by the following reaction:

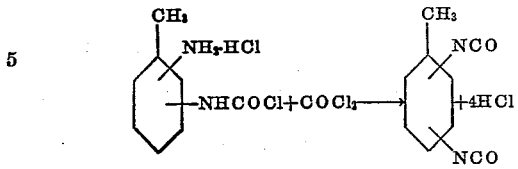

The finished reaction mixture, after degassing, is fractionated to remove the solvent and separate the pure diisocyanate. This leaves a considerable residue of polymers and by-product in the still pot. This residue is removed from the still pot and on treatment with caustic there is recovered a quantity of tolylene diamine. The higher the amount of residue, the lower the yield of toluene diisocyanate. It has been shown, of example, that by prolonging the distillation time the amount of residue in the still pot is increased. Also, by prolonging the reaction time, by-products or polymers are produced. In order to overcome this prolonged reaction time, it has been proposed that the phosgenation be conducted at super atmospheric pressures. It has been claimed that by resorting to such pressure, the reaction time can be reduced from 20 to 40 hours to as low as several minutes. Since there is an inherent danger in handling phosgene under pressure at high temperatures, conducting the reaction at atmospheric pressure is highly desirable.

In addition to o-dichlorobzene all of the above enumerated solvents are subject to the objection that due, at least in part, to the relative insolubility of the amine hydrochloride or carbamyl chloride therein, an extremely prolonged reaction time is required, which results in the formation of substantial amounts of by-products and polymers, thus adversely effecting the yield of the desired iso- and poly-isocyanates.

It is the object of the invention to provide an improved process for the manufacture of organic mono- and poly-isocyanates by an economic and technically rapid method giving a high yield of pure mono- and poly-isocyanates in a relatively short time.

A further object is to provide an improved process of producing the said isocyanates in a continuous manner.

Other objects and advantages will become manifest from the following description:

We have found that organic mono-and poly-isocyanates can be prepared at a very fast rate and in high yields by conducting the react ion at atmospheric pressure in the presence of a solvent-diluent consisting of a mixture of 50 to 95% by weight of a normally liquid alkylated benzene hydrocarbon or mixtures thereof and 5 to 50% by weight of at least one of the following:

(1) Dialkyl ether of either mono-, di-, or tri-alkylene glycol.
(2) Mono- or di-alkyl phenyl ether having the general formulas:

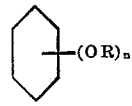

(3) Dialkyl ketone having the general formula:

R—CO—R

and (4) Alkyl phenyl ketone of the following formula:

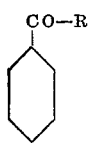

wherein R represents an alkyl group containing from 1 to 5 carbon atoms, and n represents an integer of from 1 to 2.

By employing the mixture, as constituted above, the following advantages are obtained:

(1) Good solvents for phosgene.
(2) Good solvents for organic amines and polyamines.
(3) The reaction between phosgene and amine is conducted at a very fast rate at atmospheric pressure with high yields.
(4) The reaction produces a finely dispersed carbamyl chloride slurry.
(5) There is considerable saving in the use of a mixture of liquid alkylated benzene hydrocarbons in preparing the solvent-diluent mixture as will be pointed out hereinafter.

As examples of liquid alkylated benzene hydrocarbons, the following may be used alone or as mixtures:

Toluene
o-, m-, and p-xylene
Ethylbenzene
1,2,3-; 1,2,4- and 1,3,5-trimethylbenzene
Propylbenzene
Isopropylbenzene
1,2-ethylmethylbenzene
1,3-ethylmethylbenzene
1,4-ethylmethylbenzene
1,2,3,4-tetramethylbenzene
p-Isopropylmethylbenzene
1,4-methylpropylbenzene
n-Butylbenzene
Tert-butylbenzene
p-Diethylbenzene
Tertiary amylbenzene Instead of employing a mixture of two or more of the foregoing alkylated benzenes, commercially available aromatic petroleum solvents selling for about 5¢ per pound may be used instead to considerably reduce the cost of manufacture. Such aromatic petroleum solvents distill at about 106°–182° C. and are usually guaranteed by their manufacturers to contain from 75 to 98.5% aromatic. They are readily obtainable on the open market under various trade names as may be noted from the following table:

Circular 761, Petroleum Thinner Index, published by Scientific Section of National Paint, Varnish and Lacquer Assn. Inc., October 1955, replacement pages, refers to the foregoing products as aromatic petroleum solvents.

All of the above aromatic petroleum solvents contain in various proportions the following compounds:

o-Xylene
m-Xylene
p-Xylene
Isopropylbenzene (cumene)
1-methyl-2-ethylbenzene
1-methyl-3-ethylbenzene
1-methyl-4-ethylbenzene
1,2,3-trimethylbenzene
1,3,5-trimethylbenzene (mesitylene)

The following formulae are illustrative of the dialkyl ethers of mono-, di-, and trialkylene glycols that are employed in making up the mixture with the alkylated benzene hydrocarbon(s):

$$ROCH_2CH_2OR$$

Dialkyl ethers of ethylene glycol $$ROCH_2CH_2OCH_2CH_2OR$$

Dialkyl ethers of diethylene glycol $$ROCH_2CH_2OCH_2CH_2OCH_2CH_2OR$$

Dialkyl ethers of triethylene glycol $$CH_3CH(OR)CH_2OR$$

Dialkyl ethers of propylene glycol $$CH_3CH(OR)CH_2OCH_2CH(OR)CH_3$$

Dialkyl ethers of dipropylene glycol $$ROCH_2CH(C_2H_5)CH(OR)C_3H_7$$

2-ethylhexane-1,3-dialkyl ether $$CH_3CH(OR)CH_2CH(OR)CH_3$$

Pentanediol-2,4-dialkyl ether $$CH_3C(OR)(CH_3)CH_2CH(OR)CH_3$$

Dialkyl ethers of hexylene glycol wherein each R represents an alkyl group containing from 1 to 5 carbon atoms.

It is to be noted that any one of the above dialkyl ethers may be either symmetrical or unsymmetrical. A large number of them are commercially available and the others are well known compounds being described in patent and technical literature. In view of this, it is not deemed necessary to give a specific example of each, i.e. symmetrical and unsymmetrical types, since those skilled

| Trade Name | Producer | Boiling Range, ° F. | | | Percent Aromatics |
|---|---|---|---|---|---|
| | | Initial | Dry Point | End Point | |
| Solvesso 100 | Esso | 320 | 360 | | 96.4 |
| Solvesso 150 | do | 367 | 418 | | 93 |
| Shell Cyclo Sol 53 | Shell | 314 | 336 | | 97 |
| Modsol #3 | Modern Mineral Solvents | 317 | 358 | | 75 |
| Modsol #4 | do | 320 | 348 | | 95 |
| Modsol #52 | do | 368 | 414 | | 95 |
| Modsol #12 | do | 212 | 282 | | 80 |
| Modsol #22 | do | 295 | 360 | | 79 |
| Amsco Solv B-90 | American | 272 | 356 | | 85 |
| Panasol RX-3 | Pan American | 275 | | 375 | 77.0 |
| Socal Solvent No. 2 | Standard | 280 | 330 | | 87 |
| Solvsol 27/37 | Associated | 280 | | 355 | 75 |
| Espesol 5 | Eastern | 282 | | 325 | 81 |
| Amsco Solv D-95 | American | 298 | 394 | | 98.5 |
| Amsco Hi-Flash Naphtha | do | 310 | 361 | | 90 |
| Amsco Super Hi-Flash Naphtha | do | 314 | 348 | | 95 |
| Amsco Solv F-80 | do | 322 | 395 | | 80 |
| Espesol 1 | Eastern | 324 | 349 | | 92 |
| Sinclair #30 Solvent | Sinclair | 331 | | 386 | |
| Espesol 2 | Eastern | 352 | 413 | | 96 |
| Sinclair #35 Solvent | Sinclair | 352 | | 396 | 88.9 |
| Amsco Solv F-85 | American | 358 | 397 | | 80 |
| Amsco Solv G | do | 365 | 400 | | 92 |

NOTE.—Remainder, Paraffins and Naphthenes.

in the art will have no difficulty in making the selection from the above formulae. As a guide, it may be desirable, however, to give a specific illustration of a given type, such as, for example, the dialkyl ethers of ethylene glycol, which are as follows:

Dimethyl ether of ethylene glycol
Diethyl ether of ethylene glycol
Dipropyl ether of ethylene glycol
Dibutyl ether of ethylene glycol
Methyl ethyl ether of ethylene glycol
Methyl propyl ether of ethylene glycol
Ethyl propyl ether of ethylene glycol
Propyl butyl ether of ethylene glycol The same applies to the polyalkylene glycols referred to above.

The following are illustrative of the mono- and dialkyl phenyl ethers:

Anisol
Veratrol
Phenetole
n-Propyl phenyl ether
n-Butyl phenyl ether
Iso-propyl phenyl ether
Iso-butyl phenyl ether
1,2-dimethoxybenzene
1,3-dimethoxybenzene
1,2- and 1,3-diethoxybenzene
1,2- and 1,3-dipropoxybenzene
1,2- and 1,3-dibutoxybenzene
1-methoxy-3-amyloxybenzene As regards dialkyl ketones the following are exemplary of the type that may be employed.

Diethyl ketone
Methyl propyl ketone
Isopropyl methyl ketone
Tert-butyl methyl ketone
Diisopropyl ketone
Diisobutyl ketone
Methyl butyl ketone
Methyl isobutyl ketone
Methyl amyl ketone As suitable alkylphenyl ketones may be mentioned, acetophenone, ethylphenyl ketone, n- and iso-propyl phenyl ketone, n-butyl phenyl ketone, etc.

In practicing the present invention the solvent mixture, prepared as above, is cooled and stirred to 0°–10° C. and an excess of phosgene (slightly more than stoichiometric requirements) passed into the mixture at this temperature range. A solution of the amine or polyamine is prepared by dissolving the amine in the solvent mixture and heating it to a temperature ranging between 60 and 120° C. The hot amine or polyamine solution is then slowly added to the phosgene solution at 0°–10° C. during a period of time ranging between 10 and 60 minutes. During this time a fine slurry or dispersion of the carbamyl chloride is obtained. The reaction mixture is then stirred and heated to 100°–200° C. for a period of time ranging from one to two and one-half hours while passing an excess (100–200%) of phosgene gas through the mixture. After the solution is complete, the phosgenation is continued for a short additional time and the solution cooled to 100° C. and degassed with dry nitrogen until free of acids to yield the crude product. The pure mono- or poly-isocyanate is isolated from the crude mixture by fractional distillation.

The process may be conducted in a continuous manner as follows:

A solution of the amine or poly-amine in a mixture of the solvents and a solution of phosgene in the same mixture of solvents are introduced into a cold primary reactor, in the usual manner, where a slurry of the primary reaction product in the solvent is formed. The slurry is then run into a secondary reactor at 100–200° C. where an excess of phosgene is continuously introduced. The residence time in this reactor is approximately 30 minutes. The effluent from this reactor is then transferred to a third reactor under the same conditions as in the second reactor in the usual manner. The effluent from the third reactor is continuously degassed and fractionated to yield approximately 92% of theory of an organic iso- or poly-isocyanate.

The mixture of solvents as prepared in accordance with the present invention can be employed in any synthesis of organic isocyanate and poly-isocyanate manufactured wherein an inert solvent-diluent is employed.

Practically all primary aliphatic, aromatic and arylalkyl, amines and poly amines may be converted to the corresponding isocyanate by the process of the present invention. The amine may be a mono amine, a diamine, or a polyamine. The process is applicable to amino substituted hydrocarbons, such as:

n-Dodecylamine
Isobutylamine
Benzylamine
n-Octylamine
n-Amylamine
Cyclohexylamine
Methylamine
Ethylamine
Isopropylamine
n-Butylamine
Isoamylamine
n-Decylamine
Cetylamine
n-Octadecylamine
a-Naphthylamine
Naphthmethylamine
Hexamethylenediamine
Decamethylenediamine
Ethylenediamine
Trimethylenediamine
Tetramethylenediamine
a-Methyltetramethylenediamine
$\gamma,\gamma'$-Diaminodipropyl ether
Propylenediamine
1,4-diaminobutane
1,4-cyclohexylenediamine
p-Xylylenediamine
Hexadecamethylenediamine Aniline, toluidine, benzidine, 2,4- and 2,6-tolylene diamines and mixtures thereof; phenylene diamines, 4,4'-diamino diphenyl methane, 1,5-naphthalene diamine, 4,4',4''-triamino triphenyl methane, etc.

In addition to the aforementioned amines and polyamines it is to be clearly understood that the process of the present invention is applicable to amines and polyamines containing saturated straight and branched carbon chains, aromatic-, di-, tri- and tetraamines including those containing hydrocarbon and other substituents such as chlorine, etc. The only precaution to be observed in selecting the amine or polyamine is that it be free of gorups other than the amino which are capable of reacting with the isocyanate radical, i.e. containing active hydrogen atoms.

The process of the present invention is illustrated by the following representative examples:

*Example I*

Into a 2 liter 4 neck flask were charged a mixture of 510 grams of cumene and 90 grams of diethyl ether of diethylene glycol (diethyl carbitol). This solvent mixture was cooled and stirred to 0–10° C. and 140 grams of phosgene were passed in while maintaining the same temperature. 122 grams of tolyene diamine consisting of 80% of 2,4- and 20% of 2,6-isomers were dissolved in a mixture of 170 grams of cumene and 30 grams of diethyl carbitol by heating to 100° C. This hot solution was then added dropwise to the phosgene solution at 0–

10° C. over about 20 minutes. A fine slurry resulted. This mixture was stirred and heated to 100°–165° C. over a period of about 2½ hours while passing phosgene gas through the mixture at a rate of approximately 1 gram per minute. After solution was complete, the phosgenation was continued for a short additional time. At this time, the solution was cooled to 100° C. and degassed with dry nitrogen until free of acid. The weight of the crude material amounted to 948 grams. From this crude material, a mixture of 2,4- and 2,6-tolylene diisocyanates was isolated by fractional distillation. A yield of about 89% of theory was obtained.

*Example II*

Into a 2-liter 4 neck flask were charged a mixture of 510 grams of an aromatic petroleum solvent having a boiling range between 320° F.–360° F., sold under the trade name of "Solvesso 100" and 90 grams of (diethyl Carbitol) diethyl ether of diethylene glycol. This solvent was cooled and stirred to 0–10° C. and 140 grams of phosgene were passed in at this temperature. 122 grams of tolylene diamine, consisting of 80% of 2,4- and 20% of 2,6-isomers were dissolved in a mixture of 170 grams of "Solvesso 100" and 30 grams of diethyl Carbitol by heating to 100° C. This hot solution was then added dropwise to the phosgene solution at 0–10° C. over about 20 minutes. A fine slurry resulted. This mixture was stirred and heated to 100°–165° C. over a period of about 2½ hours while passing phosgene gas through the mixture at a rate of approximately 1 gram per minute. After solution was complete, the phosgenation was continued for a short additional time. At this time, the solution was cooled to 100° C. and degassed with dry nitrogen until free of acids. The weight of the crude material amounted to 948 grams. From this crude material, a mixture of 2,4- and 2,6-tolylene diisocyanates was isolated by fractional distillation. A yield of about 90% of theory was obtained.

*Example III*

The procedure in Example I was repeated with the exception that 420 grams of "Solvesso 100" and 180 grams of diethyl ether of diethylene glycol (diethyl Carbitol) instead of 510 grams of "Solvesso 100" and 90 grams of diethyl Carbitol was used to dissolve the phosgene and 140 grams of "Solvesso 100" and 60 grams of diethyl Carbitol instead of 170 grams of "Solvesso 100" and 30 grams of diethyl Carbitol was used to dissolve the mixture of 2,4- and 2,6-toluenediamines. The yield of the mixture of 2,4- and 2,6-toluene diisocyanates was 90%.

*Example IV*

Into a 2-liter 4 neck flask were charged a mixture of 420 grams of mesitylene and 180 grams of n-butylphenyl ether. The solvent mixture was cooled and stirred to 0–10° C. and 140 grams of phosgene were passed in at this temperature. 198 grams of 4,4'-diamino diphenyl methane were dissolved in a mixture of 140 grams of mesitylene and 60 grams of n-butylphenyl ether by heating to 100° C. The hot solution was treated with phosgene as in Example I to yield a crude material which upon fractional distillation yielded 88% of the corresponding diisocyanate.

*Example V*

Into a 2 liter 4 neck flask were charged a mixture of 570 grams of "Solvesso 100" and 30 grams of methyl isobutyl ketone. The solvent mixture was cooled and stirred to 0–10° C. and 140 grams of phosgene passed while maintaining this temperature. 122 grams of 2,6-tolylene diamine were dissolved in a mixture of 195 grams of "Solvesso 100" and 5 grams of methyl isobutyl ketone by heating to 100° C. This hot solution was then added dropwise to the phosgene solution at 0–10° C. over about 20 minutes. A fine slurry resulted. This mixture was stirred and heated to 100°–165° C. over a period of about 2½ hours while passing phosgene gas through the mixture at a rate of approximately 1 gram per minute. After solution was complete, the phosgenation was continued for a short additional time. At this time, the solution was cooled to 100° C. and degassed with dry nitrogen until free of acids. The weight of the crude material amount to 948 grams. From this crude material, a mixture of 2,4- and 2,6-tolylene diisocyanates was isolated by fractional distillation. A yield of about 90% of theory was obtained.

*Example VI*

Into a 2 liter 4 neck flask were charged a mixture of 300 grams of p-xylene and 300 grams of ethylphenyl ketone. This solvent mixture was cooled and stirred to 0–10° C. and 140 grams of phosgene were passed while maintaining this temperature. 122 grams of 2,4-tolylenediamine were dissolved in a mixture of 100 grams of p-xylene and 100 grams of ethylphenyl ketone by heating to 100° C. This hot solution was then added dropwise to the phosgene solution at 0–10° C. over about 20 minutes. A fine slurry resulted. This mixture was stirred and heated to 100°–165° C. over a period of about 2½ hours while passing phosgene gas through the mixture at a rate of approximately 1 gram per minute. After solution was complete, the phosgenation was continued for a short additional time. At this time, the solution was cooled to 100° C. and degassed with dry nitrogen until free of acids. The weight of the crude material amounted to 948 grams. From this crude material, a mixture of 2,4- and 2,6-tolylene diisocyanates was isolated by fractional distillation. A yield of about 89% of theory was obtained.

*Example VII*

Example VI was repeated with the exception that the p-xylene in both solvent mixtures was replaced by an equivalent amount of "Solvesso 100." The yield of the final product after fractional distillation amounted to about 89% of theory.

We claim:
1. The process of preparing aromatic isocyanates which comprises reacting a solution of phosgene in an inert solvent with a solution of an aromatic amino compound selected from the class consisting of organic mono- and poly-amines in the same inert solvent at atmospheric pressure and at a temperature of 100°–200° C. while passing phosgene through the solution mixture, removing the hydrogen halides from the reaction mixture and recovering the isocyanate, the said inert solvent comprising from 50 to 95% by weight of an aromatic petroleum solvent distilling at approximately 125°–225° C. and from 5–50% by weight of an oxygen bearing organic compound selected from the group consisting of dialkyl ethers of mono-, di- and tri-alkylene glycols.

2. The process according to claim 1 wherein the oxygen bearing organic compound is ethylene glycol diethyl ether.

3. The process according to claim 1 wherein the oxygen bearing organic compound is diethyl ether of diethylene glycol.

4. The process according to claim 1 wherein the inert solvent consists of 15% by weight of diethyl ether of diethylene glycol and 85% by weight of an aromatic petroleum solvent distilling at 125°–225° C.

References Cited in the file of this patent

UNITED STATES PATENTS

| | | |
|---|---|---|
| 2,640,068 | Schaefer et al. | May 26, 1953 |
| 2,680,130 | Flores | June 1, 1954 |
| 2,683,160 | Irwin | July 6, 1954 |
| 2,706,733 | Reid | Apr. 19, 1955 |

FOREIGN PATENTS

| | | |
|---|---|---|
| 631,025 | Great Britain | Oct. 26, 1949 |